(12) United States Patent
Kraytem et al.

(10) Patent No.: US 10,360,252 B1
(45) Date of Patent: Jul. 23, 2019

(54) DETECTION AND ENRICHMENT OF MISSING DATA OR METADATA FOR LARGE DATA SETS

(71) Applicant: Palantir Technologies Inc., Palo Alto, CA (US)

(72) Inventors: Hind Kraytem, London (GB); Arnaud Drizard, Paris (FR); Ludovic Lay, Paris (FR); Jean Caillé, Paris (FR)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 14 days.

(21) Appl. No.: 15/910,672

(22) Filed: Mar. 2, 2018

Related U.S. Application Data

(60) Provisional application No. 62/596,685, filed on Dec. 8, 2017.

(51) Int. Cl.
  *G06F 17/00* (2019.01)
  *G06F 16/38* (2019.01)
  (Continued)

(52) U.S. Cl.
  CPC .......... *G06F 16/381* (2019.01); *G06F 3/0482* (2013.01); *G06F 16/335* (2019.01); *G06F 17/246* (2013.01)

(58) Field of Classification Search
  CPC . G06F 17/30725; G06F 17/246; G06F 16/381
  See application file for complete search history.

(56) References Cited

U.S. PATENT DOCUMENTS 5,418,950 A  5/1995 Li et al.
5,428,737 A  6/1995 Li et al.
(Continued)

FOREIGN PATENT DOCUMENTS

DE  102014103482  9/2014
EP  1647908  4/2006
(Continued)

OTHER PUBLICATIONS

"A Quick Guide to UniProtKB Swiss-Prot & TrEMBL," Sep. 2011, pp. 2.
(Continued)

*Primary Examiner* — Stephen S Hong
*Assistant Examiner* — Marshon L Robinson
(74) *Attorney, Agent, or Firm* — Knobbe Martens Olson & Bear LLP

(57) ABSTRACT

Data stored in large scale systems often includes significant amounts of data and metadata. The data and metadata provide valuable structures for efficient data organization and analysis. However, when the data or metadata is missing, the missing data or metadata can cause disruption in organization and analysis efforts. A system with interactive user interfaces for enrichment of missing data or metadata is described. The system provides various dynamic filters to detect and identify data items with missing data or metadata. The system also provides for intuitive and efficient navigation of data items for determination of the missing data or metadata. Via its user interfaces, the system enables users to supply, or enrich, the missing data or metadata. Additionally, the user interfaces enable users to dynamically change available data or metadata values used for enrichment. Also, the system generates enriched output data sets, which may facilitate analysis of processes and systems.

18 Claims, 8 Drawing Sheets

(51) Int. Cl.
　　*G06F 3/0482*　　　　(2013.01)
　　*G06F 17/24*　　　　(2006.01)
　　*G06F 16/335*　　　(2019.01)

(56)　　　　　　References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,225,189 B1 | 5/2007 | McCormack et al. |
| 7,406,592 B1 | 7/2008 | Polyudov |
| 7,519,589 B2 | 4/2009 | Charnock et al. |
| 7,546,286 B2 | 6/2009 | Dickinson et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,840,600 B1 | 11/2010 | Bhatia |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,108,779 B1 | 1/2012 | Rein et al. |
| 8,140,958 B2 | 3/2012 | Garrett et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0282429 A1 | 12/2006 | Hernandez-Sherrington et al. |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2007/0286099 A1 | 12/2007 | Stocklein et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0260060 A1 | 10/2009 | Smith et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0185305 A1 | 7/2011 | Lai et al. |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |

(56) References Cited

U.S. PATENT DOCUMENTS

| | | |
|---|---|---|
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2016/0173594 A1 | 6/2016 | Nelson et al. |
| 2016/0292206 A1 | 10/2016 | Velazquez et al. |
| 2017/0068712 A1 | 3/2017 | Streufert et al. |
| 2018/0046608 A1 | 2/2018 | Yousaf et al. |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Tour of Pinboard," <http://pinboard.in/tour> as printed May 15, 2014 in 6 pages.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"The FASTA Program Package," fasta-36.3.4, Mar. 25, 2011, pp. 29.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51D55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Macdonald et al., "Pro ASP.NET in C# 2010," Fourth Edition, Chapter 8, 2010.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Con-

(56) References Cited

OTHER PUBLICATIONS ference on Knowledge Engineering and Knowledge Management (EKAW 2008),ÊAcitrezza, Catania, Italy, Sep.Ê29-Oct. 3, 2008, pp. 16.

Stamos et al., "Remote Evaluation," Journal ACM Transactions on Programming Languages and Systems (TOPLAS) vol. 12, Issue 4, Oct. 1990, pp. 537-564.

Steve Jones Ed—Association for Computing Machinery: "Graphical query specification and dynamic result previews for a digital library", UISt '98. 11th Annual Symposium on User Interface Software and Technology. Proceedings of the ACM Symposium on User Interface Software and Technology San. Francisco, CA Nov. 1-4, 1998, pp. 143-151.

Wikipedia, "Machine Code", p. 1-5, printed Aug. 11, 2014.

Wollrath et al., "A Distributed Object Model for the Java System," Proceedings of the 2nd Conference on USENEX, Conference on Object-Oriented Technologies (COOTS), Jun. 17, 1996, pp. 219-231.

Official Communication for European Patent Application No. 18166684.3 dated May 25, 2018.

Official Communication for U.S. Appl. No. 15/258,918 dated Aug. 10, 2017.

Official Communication for U.S. Appl. No. 15/258,918 dated Dec. 21, 2017.

Official Communication for U.S. Appl. No. 15/258,918 dated May 30, 2017.

Official Communication for U.S. Appl. No. 15/484,983 dated Nov. 6, 2017.

ENRICHMENT SYSTEM

1. DATA FILTERS

TYPE
| COMPLI-ANCE | PRODUCT | OTHER |

SOURCE
| ALL ▽ | 202

2. METADATA

DELIVERY
| SHIPPED FROM ▽ | 204

VERSION
| SW VERSION ▽ | 206

ORIGINATING CITY
| SPRINGFIELD ▽ |

ORIGINATING STATE
| AZ ▽ | 222

CODE
| 1.7 Release ▽ | 208

3. OTHER

USER COMMENT
| [Blank] |

| ANALYSIS |
| MANAGE METADATA | — 210

| CONFIRM |

👤 USER 1
ACCESS: QC

— 212

| DELIVERY | SHIPPED FROM | ORIGINATING CITY | ORIGINATING STATE | VERSION TYPE | SW VERSION |
|---|---|---|---|---|---|
| SHIPPED FROM | ORIGINATING CITY | BOSTON | AL | SW VERSION | 0.92 |
| SHIPPED TO | ORIGINATING STATE | CHICAGO | AK | HW VERSION | 1.8 Release |
| CARRIER | ORIGINATING FACILITY | GLOUCESTER | AZ | ... | 2.0 Release Candidate |
| SIGNATURE | ... —214 | SPRINGFIELD | AR | | 2.1 Release |
| ... | | ROCKPORT | CA | | 2.2 Release |
| | | ... | ... | | ... |

220 ⬋

| RECORD 115 |
| RECORD 153 |
| RECORD 179 |
| RECORD 180 |
| ▽ |

MSRP: $999.99

Employee Discount: 20%

Price Charged: $799.99

Widget 53

| UNIQUE ID | ORIGINATING CITY | ORIGINATING STATE | SW VERSION |
|---|---|---|---|
| ... | ... | ... | ... |
| RECORD 114 | BOSTON | MA | 1.8 Release |
| RECORD 115 | SPRINGFIELD | AZ | NULL |
| ... | ... | ... | ... |
| RECORD 193 | NULL | NULL | 0.92 |
| ... | ... | ... | ... |

INPUT DATASET

OUTPUT DATASET EXAMPLE 1

| UNIQUE ID | ORIGINATING CITY | ORIGINATING STATE | SW VERSION | Comments |
|---|---|---|---|---|
| ... | | | | NULL |
| RECORD 115 | SPRINGFIELD | AZ | 1.7 Release | NULL |
| RECORD 193 | CHICAGO | IL | | Last minute change to expedited shipping |
| ... | ... | ... | ... | ... |

OUTPUT DATASET EXAMPLE 2

| UNIQUE ID | ORIGINATING CITY | ORIGINATING STATE | SW VERSION | Comments |
|---|---|---|---|---|
| ... | ... | ... | ... | NULL |
| RECORD 114 | BOSTON | MA | 1.8 Release | NULL |
| RECORD 115 | SPRINGFIELD | AZ | | NULL |
| ... | ... | ... | ... | NULL |
| RECORD 193 | CHICAGO | IL | | expedited... |
| ... | | | | |

DETECTION AND ENRICHMENT OF MISSING DATA OR METADATA FOR LARGE DATA SETS

CROSS-REFERENCE TO RELATED APPLICATIONS

This application claims benefit of U.S. Provisional Patent Application No. 62/596,685, filed Dec. 8, 2017, and titled "DETECTION AND ENRICHMENT OF MISSING DATA OR METADATA FOR LARGE DATA SETS". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, visualization, management, and interaction. More specifically, the present disclosure relates to systems and techniques for enriching missing data or missing metadata.

BACKGROUND

Data items stored in large scale systems often include significant amounts of data and metadata (e.g., data about data). However, some data may be incomplete or missing in the large scale systems due to faulty data source interfaces or human mistakes in data entry. Existing systems do not provide simple, efficient, and intuitive ways of identifying missing data and correctly enriching the missing data with correct data. Additionally, while metadata can provide valuable structures for efficient data organization and analysis, missing metadata may also go undetected due to its associative nature in relation to the original data. The problem is especially acute in systems managing large data sets. Without proper detection and subsequent enrichment of data and metadata, the missing data and metadata can cause disruption in data organization and analysis efforts.

Although it is desirable for users to have systems and techniques for easy detection and effective management of missing data and metadata, existing systems may not provide such effective detection, visualization, and/or management of data and metadata. For example, existing systems may not readily bring the missing data or metadata to attention, and may only provide limited information from which to identify the missing data and metadata. Even when the missing data or metadata is identified, the existing systems may not provide intuitive and efficient ways of determining the correct data or metadata to enrich the missing data or metadata. Additionally, such systems may be inflexible in management of data and metadata, and may not provide intuitive reporting of the data and metadata.

SUMMARY

The disclosure herein presents various embodiments of systems and techniques related to data integration, analysis, visualization, and management for enriching data with missing data or metadata. The system and related methods described herein provides an intuitive and efficient way to detect and enrich missing metadata, including via interactive user interfaces.

The system may access sets of data items and associated metadata items. The data items can be associated with unique identifiers, and may be further associated with various classifications.

The system may provide an interactive user interface by which the user may dynamically filter the sets of data items based on classifications associated with the data items. In an implementation, the system may further automatically filter the sets of data items to only those data items that are missing data item values, or to only those data items that are missing associated metadata item values. In response to a user selecting a filter, the system may provide a list of unique identifiers associated with the filtered data items for user selection.

The system may further provide, via the interactive user interface: (1) selectable dropdowns for certain data or metadata items associated with the selected data item, and (2) a viewing pane including a collection of information related to the data item (alternatively, "related information"). In some implementation, the viewing pane is optional. Using the selectable dropdowns, the user may view current data or metadata item values, and change the data or metadata item values. Further, the user may efficiently identify any data or metadata items that are missing values (e.g., as the associated selectable dropdowns may be blank and/or highlighted in the interactive user interface). Metadata and data item values may be changed, selected, and/or input via the interactive user interface by interaction with the selectable dropdowns, or by direct input of data or metadata item values. The viewing pane including the collection of information related to the data item may be useful to the user and/or the system in identifying suggestions for the missing data or metadata item values.

The user may input data or metadata item values, e.g., for those data or metadata items that are missing. Such inputs may be provided via the selectable dropdowns. Accordingly, according to certain embodiments of the present disclosure, the user may efficiently enrich selected data items and metadata items associated with selected data items. In some implementations the selectable dropdowns are pre-populated with selection options based on data or metadata item values associated with other data items of the sets of data items. In some implementations, the system may provide a further interactive user interface (including, a spreadsheet user interface in some embodiments) by which the user may view and edit the selection options that are pre-populated into each selectable dropdown for each data or metadata item. Accordingly, a nontechnical user may efficiently modify functionality of the interactive user interface to enable further efficiencies in enriching the sets of data items with data and metadata item values for missing data and metadata items.

The system may generate a separate sets of enriched data items, including updated data and metadata item values (e.g., in which the missing data and metadata items are replaced with metadata item values selected or input by the user), having a structure similar to the imported sets of data items. Further, in certain implementations the separate sets of enriched data items may include additional data items and/or metadata items (e.g., comments, etc.) that may also be added by the user via the interactive user interface. The separate sets of enriched data items may be stored as a separate file/table/spreadsheet/database from the original, imported sets of data items to advantageously maintain the imported sets of data items in its original unmodified form. In some implementations, during analysis of the sets of data items, the user may optionally and advantageously merge or join the imported sets of data items and the separate sets of enriched data items in order to analyze the sets of data items in view of the enrichment provided by the user and the system via the interactive user interfaces described herein.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of data items, associated metadata items and values, and collection of information related to the data item, which may enable a user to more quickly access, navigate, assess, digest, edit, and enrich various information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to display electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a computing system comprises: one or more processors; at least one storage device configured to store data, wherein the computing system, via execution of program instructions by the one or more processors, is configured to: access sets of data items and associated metadata items, wherein the data items are associated with unique identifiers; provide a first interactive user interface including at least: a list of unique identifiers associated with one or more data items of the sets of data items, selectable dropdown user interface elements associated with metadata items, and a viewing pane configured to display collections of information related to selected data items; in response to receiving, via the first interactive user interface, a selection of a first unique identifier of the plurality of unique identifiers: determine a first data item associated with the unique identifier; populate the selectable dropdown user interface elements to include metadata item values associated with the first data item; and populate the viewing pane with a collection of information associated with the first data item; provide a second interactive user interface configured to enable interactive modifications to selection options associated with the selectable dropdown user interface elements, wherein: the second interactive user interface includes at least an editable spreadsheet including columns corresponding to the metadata items, the columns include selection options associated with the corresponding metadata items, and the editable spreadsheet is configured to receive user inputs modifying, deleting, or adding selection options associated with the corresponding metadata items; and dynamically update selection options in the selectable dropdown user interface elements associated with the metadata items based on selection options included in corresponding columns of the editable spreadsheet.

In some embodiments, the selection options are dynamically updated in response to the user exiting the second interactive user interface and returning to the first interactive user interface. In some embodiments, the selection options are dynamically updated in response to the user editing the second interactive user interface by providing new metadata item value. In some embodiments, one or more selection options are automatically suggested by the computing system and added to the dropdown selection options. In some embodiments, at least one of the selectable dropdown user interface elements is missing a metadata item value for the associated metadata item.

In some embodiments, the computing system is further configured to: in response to using a dropdown user interface to select a selection option from the selection options representing a metadata item value, enrich the missing metadata item value with the selected metadata item value. In some embodiments, the computing system is further configured to: provide a user interface to confirm one or more selections of metadata item values for the missing metadata item, wherein in response to the user confirming the selection of metadata item values in lieu of the missing metadata item values, generate an updated data set containing a structure of the accessed data set that has replaced the missing metadata item values with the selected metadata item values. In some embodiments, the system stores the updated data set as an independent data set from the accessed data set. In some embodiments, the updated data set only includes data items from the accessed data set with replaced metadata item values.

In some embodiments, the viewing pane is further configured to: provide selectable tabs each associated with a category of the collection of information related to the first data item; receive a user input accessing one of the selectable tabs; and in response to the user input accessing the one of the selectable tabs: update the viewing pane to provide information associated with the category from the collection of information related to the first data item. In some embodiments, the computing system is further configured to: provide a user interface element capable of selecting one or more sets of data items; receive a user input selecting one or more sets of data items; and replace the accessed sets of data items with the one or more selected sets of data items. In some embodiments, the data items are further associated with various classifications by which the data items are dynamically filtered, wherein the user may dynamically filter the sets of data items based on classifications associated with the data items.

In some embodiments, the user is associated with one or more data item access restrictions and the system conceals from the user one or more sets of data items from selection. In some embodiments, the sets of data items are automatically filtered to only contain data items that are missing associated metadata item values. In some embodiments, the metadata item values associated with the data item are pre-selected as selected options of the selectable dropdowns. In some embodiments, the first interactive user interface is further configured to: receive user inputs modifying, deleting, or adding user comments associated with the corresponding data item. In some embodiments, the computing system is further configured to: provide a counter for the total number of data items with any missing metadata item values.

In some embodiments, the viewing pane is further configured to: provide a selectable user interface element associated with a second data item having one or more common metadata item values for corresponding metadata items compared to the first data item; receive a user input accessing the selectable user interface element; and in response to the user input accessing the selectable user interface element: update the viewing pane to include a collection of information related to the second data item. In some embodiments, the viewing pane is further configured to: provide selectable tabs each associated with a category of the collection of information related to the second data item; receive a user input accessing one of the selectable tabs; and in response to the user input accessing the one of the selectable tabs: update the viewing pane to provide information associated with the category from the collection of information related to the second data item.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 2 illustrates another example user interface of the metadata enrichment system, according to an embodiment.

FIGS. 3A-3C illustrate an example input data set with one or more missing metadata item values, and example output data sets with the one or more missing metadata item values enriched, according to various embodiments.

DETAILED DESCRIPTION

Overview

Figure 1A:
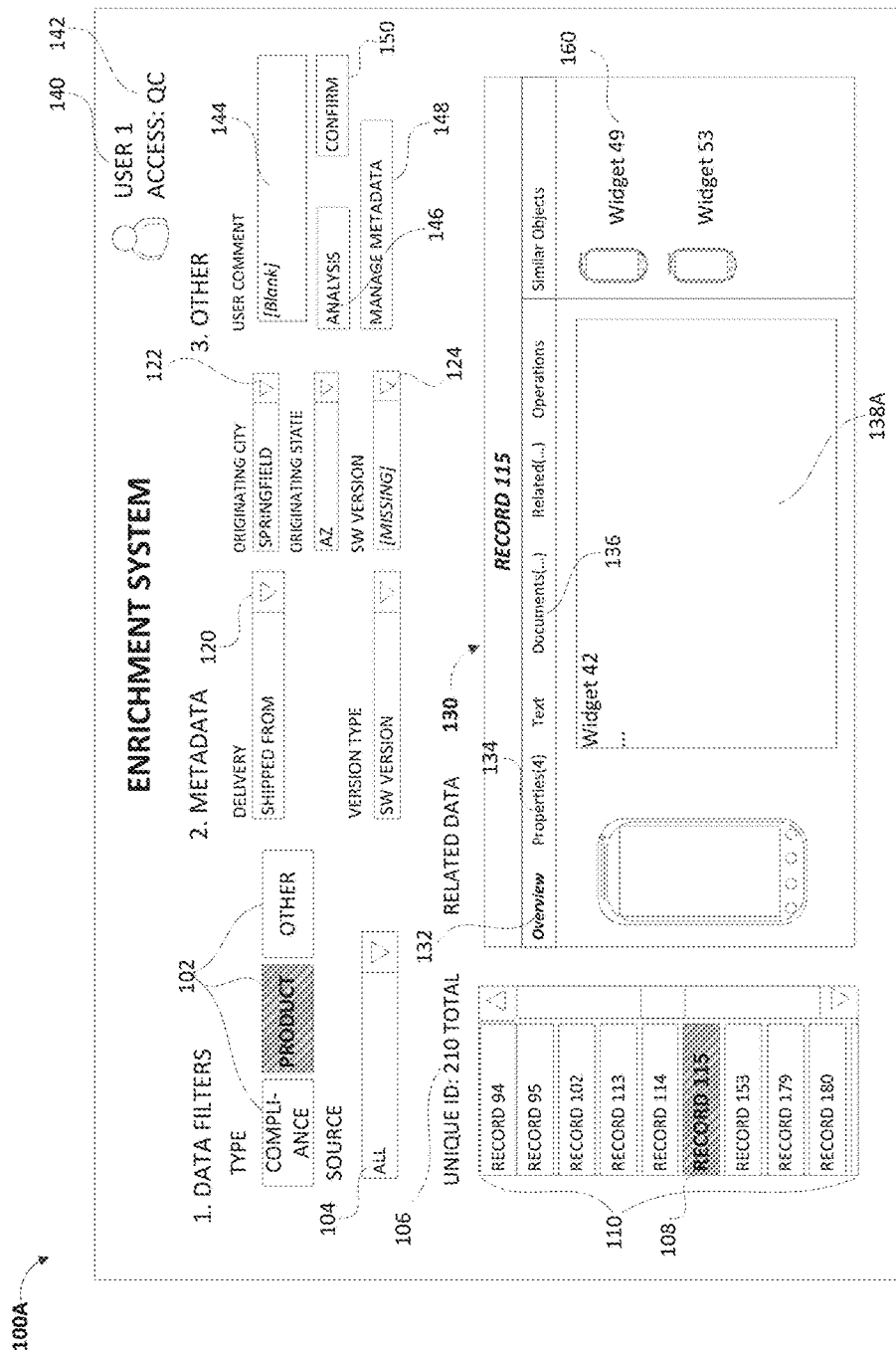
FIGS. 1A-1B illustrate example user interfaces of a metadata enrichment system, according to various embodiments.

The disclosure herein presents various embodiments of systems and techniques related to data integration, analysis, visualization, and management for enriching data items with missing data or metadata. For example, one embodiment of the system described herein provides the ability for users to identify the missing data or metadata, allow configurable management of data or metadata, and provide an intuitive reporting of the enriched data item.

As an introductory note, while different terminologies of data and metadata are used throughout the disclosure, the distinction is mostly semantic and both terms can describe data items in similar capacity. For instance, a data item of a book may have associated title data of "The Old Man and the Sea" and data associated with the title data (e.g., metadata or property), such as total page number, publication year, number of chapters, or ISBN. In the alternative, the data items of the book may include all of the title, total page number, publication year, number of chapters, and ISBN as the "data" and have, as a metadata, the book's Dewey Dot System number for finding the book in a particular section in a library.

The book's Dewey Dot System number, similarly with total page number, publication year, number of chapters, or ISBN, can be considered integral to the book data item and, therefore, is data and not metadata. As described, the drawing of a line between a data and metadata can be mostly semantic and without a clear distinguishing line. Therefore, in some instances, some metadata can be semantically considered data and some data can be semantically considered metadata. Where applicable, the terms data and metadata may be interpreted interchangeably. Therefore, the metadata enrichment system and related methods disclosed herein can be used for both data and metadata. In this disclosure, there is a preference toward the term metadata to facilitate the disclosure without possible confusion from use of the term "data."

Data items stored in large-scale systems often includes a significant amount of metadata. The metadata can provide valuable structures for efficient data item organization and analysis. For example, where a data item contains information related to a widget, the widget may have associated metadata, such as software version or hardware version. Additionally, where a delivery of the widget is concerned, the widget may have associated metadata such as originating city, state, ZIP Code, carrier, or whether a recipient's signature was obtained. The metadata may not relate directly to the widget itself, but nevertheless is associated with the widget in some structural, descriptive, or administrative capacity. For example, the delivery metadata or version metadata can provide significant information used for analyzing quality control, compliance, and/or recipient satisfaction.

There exist many metadata collection mechanisms. For example, sensors configured to detect, characterize, and record the metadata may be installed and managed for creation of the metadata. When concerning delivery metadata, a widget may have an associated barcode that is scanned by a carrier at the delivery origination and/or upon completed delivery. The scanned barcode can provide delivery metadata.

However, in practice, some important metadata may not be generated, or may be lost, for various reasons. In some instances, the metadata may have been generated, but may not have been properly associated with the corresponding data. Such instances may arise as a result of sensor malfunction, sensor shut down, human error, mismatching systems (including unsynchronized system versions and/or wrong data association schema), communication failure, etc. The failed generation or missed association may result in missing metadata.

Missing metadata, unless identified, can cause inaccurate analysis of the metadata which in turn can cause inaccurate analysis of the data item itself. Worse, the missing metadata may effectively hinder an opportunity for process improvement. For example, missing widget delivery carrier information can provide little to no helpful information about establishing a new distribution center. Missing software version information can provide little to no helpful information about why one or more particular widgets may have malfunctioned.

The present disclosure describes a system for efficient detection and management of missing metadata. The detection and identification of the missing metadata is greatly improved with user interfaces of the system which provide intuitive filtering and display of the missing metadata. The user interfaces may provide one or more filters to change or limit of the missing metadata inspected. Further, the user interfaces may organize and provide related data for determination of the correct metadata to enrich the missing metadata. For example, in the context of the missing widget delivery carrier, the user interface may make available for review other widgets having the same shipping dates. By referring to the other widgets with the same shipping dates, or by confirming suggested metadata determined and provided by artificial intelligence or machine learning of the system, a user responsible for the management of the metadata may confidently enrich the data item with correct metadata.

The system may provide further user interfaces for efficient and intuitive addition, deletion, and/or modification of the available metadata item values associated with the missing metadata item. For example, in the widget example above, if the user determines that a delivery carrier was a new entity not yet within the system, the user may request the system to provide the second user interface to facilitate the addition of the new carrier entity as an available metadata item value without first exiting the first user interface. Additionally, the system can provide generation of a concise but informative summary of enrichment activities.

Various aspects and embodiments of the systems and techniques are described in further detail below.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object, Data Item, Object, or Item: A data container representing information that has a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties or Metadata: Attributes of, or other information about, a data object. A property or metadata is associated a data object in some structural, descriptive, or administrative capacity. For example, a property or metadata associated with a data object of a book can be an authorship of the book (descriptive), how pages are ordered to form chapters (structural), or where the book is located in a library (administrative). In this application, a property and metadata are interchangeable in their capacity to refer to a data about data object. At a minimum, each property of metadata item of a data object has a property type and a value or values. For example, an object may be an image file, and a metadata item of the image file may be a file format. Object type may be a property of an object. A property or metadata can be stored in a same or similar database as the data object, data item, object, or item.

Property/Metadata Item Type: The type of data a property is, such as a string, an integer, or a double. Property types may include complex property types, such as a series data values associated with timed ticks (e.g. a time series), etc.

Property/Metadata Item Value: The value associated with a property/metadata item, which is of the type indicated in the property type associated with the property. A property may have multiple values. Continuing the example above, for the metadata item "file format," corresponding metadata item values may include JPEG/JFIF, JPEG 2000, Exif, TIFF, GIF, BMP, PNG, PPM, PGM, PBM, PNM, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Metadata Enrichment System

Figure 1B:
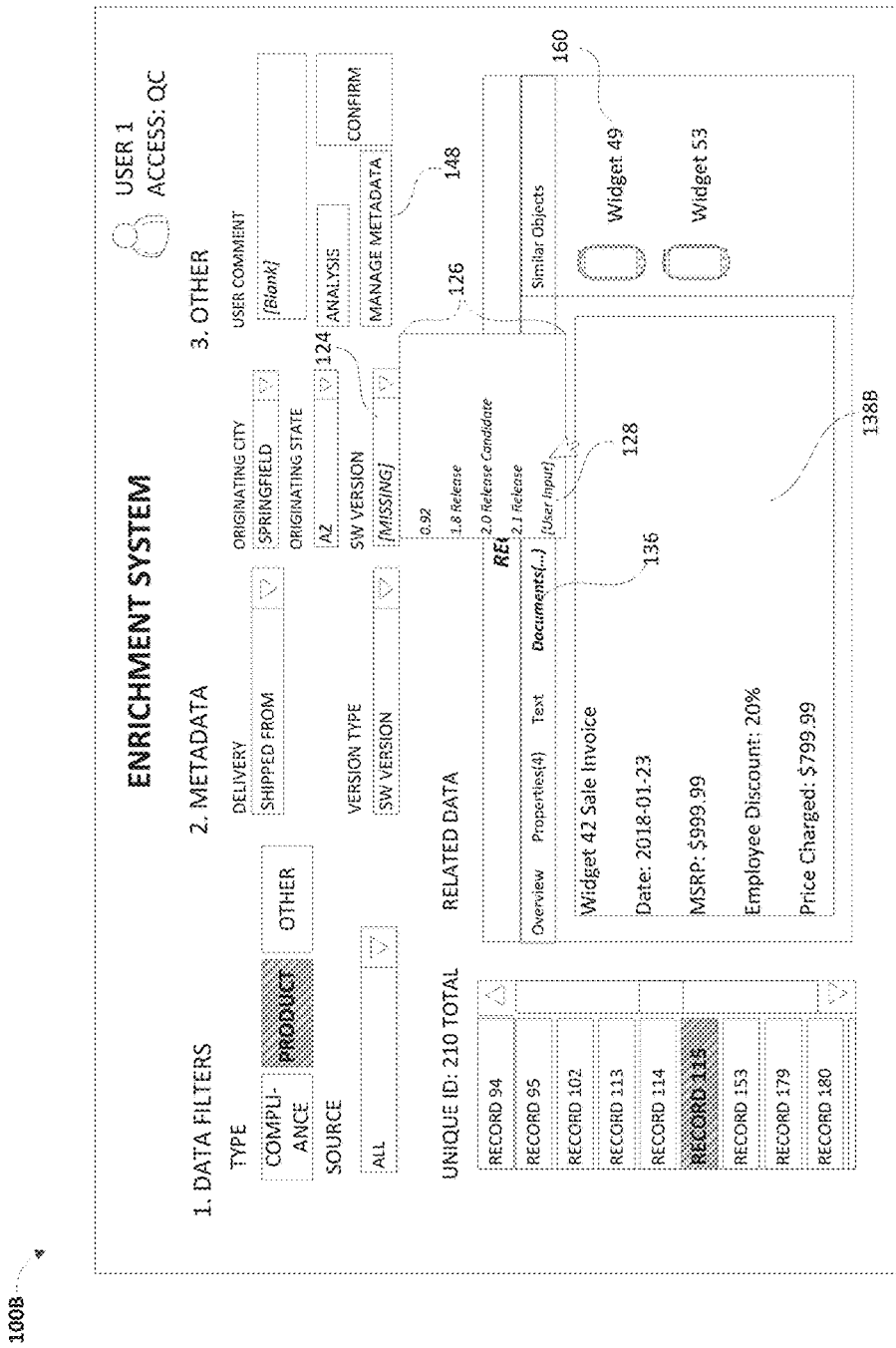

FIGS. 1A-1B illustrate example user interfaces of a metadata enrichment system according to some various embodiments. The system may include various types of user interface elements including scope selection interface elements (scope filter 102 and data source 104), record identification and selection interface elements (106 and 108), metadata enrichment elements (120, 122, and 124), related data presentation elements (130, 132, 134, 136, 138A, and 160), and other information elements (140, 142, 144, 146, and 148). The metadata enrichment system may be implemented on a computing system, such as the computing system 700 described with respect to FIG. 7.

The scope selection elements may include scope filter element 102 and data source selection element 104. The scope filter element may be a set of user selectable buttons each representing a scope of interest. For example, with respect to FIG. 1A, a user may select compliance-related scope, product-related scope, or some other scope. Compliance scope may relate to compliance with various internal (such as, internal quality control), governmental (such as, FCC or FDA compliance), or some agency policy. Selecting the compliance scope may change the identification and detection scope of missing metadata item values to information used to monitor validity of quality control, such as whether a particular product belonged to a control group or a treatment group. Selecting the product scope may cause the system to provide detection and identification of product-related metadata, such as the delivery information 122 or version information 124. As the last selectable scope of the scope filter element 102 illustrates, the user interface may provide for other scopes of interest.

A scope may have an associated metadata list containing one or more metadata items of a data item. For example, quality control scope may be associated with a metadata list containing {SW VERSION, HW VERSION} but not {ORIGINATING CITY, ORIGINATING STATE} which is more likely to be associated with compliance-scope. Selection of the scope directs the system to detect and identify from a data set any data item that is missing metadata item values of the one or more associated metadata items. In other words, depending on the scope selected, the system may ignore the detection and identification of data items only missing metadata item values outside the scope. Advantageously, the scope selection can facilitate the enrichment process. For example, a product-related personnel, such as a quality engineer, may direct the metadata enrichment system to limit its identification and detection scope to software and hardware versions. Alternatively, a logistics personnel may select a scope containing {ORIGINATING CITY, ORIGINATING STATE} but excluding {SW VERSION, HW VERSION} to facilitate identification, detection, and enrichment of the scoped metadata items.

The data source selection element 104 may allow selection of one or more database for the detection and identification of missing metadata. In some instances, data source may be a database. In some instances, data source may be two or more databases, including, as illustrated, 'ALL' applicable databases.

The record identification and selection interface elements may provide a list 110 of data items with missing metadata. As described, the list 110 may be based on scope provided by the scope filter element 102 and data source selection element 104. Each data item with missing metadata may be associated with a unique ID, which may be the unique ID of the data item itself or may be an independent unique ID serving as connection between the data item and a set of metadata item values. The unique IDs of the data item with missing metadata may be provided in a list 110 as selectable user interface elements, such as clickable buttons.

In some embodiments, a total number 106 of the data items in the list may be provided for a quick showing of the degree of missing metadata. In some embodiments, a number representing a total number of missing metadata item values may be displayed in lieu of, or in addition to, the total number of data items with missing metadata. Such total numbers are advantageous in that they represent a health of a data set. The lower the total number, the more enriched a data set is. The more enriched a data set is, the more effective an analysis on the data set can be.

The list 110 of data items with missing metadata may provide for selection of one or more data items on the list via user selectable interface elements. For example, RECORD 115 is selected in the example user interface. As one may appreciate, the user interface provides for efficient and intuitive identification of data items with missing metadata as well as selection of a particular data item for viewing the associated metadata item values.

The metadata enrichment elements may include metadata items and associated user interface elements used to enrich the missing metadata item values. In some instances, the metadata items may have associated hierarchical structures. For example, a metadata item may be a parent node and have one or more associated metadata item values as children nodes. In the example illustration, delivery metadata item 120, a parent level element, has originating city 122 and originating state as lower level elements (there may be more lower level elements, such as 'originating facility' 214 shown in FIG. 2, which are omitted in the example illustration in order to simplify FIG. 1A). In some embodiments, the displayed metadata items may be pre-programmed to match characteristics and structure of a source data set. In some embodiments, the displayed metadata items may be generated based on the system's analysis of the ontology of the data item.

As described, the example user interface provides interface elements used to enrich the missing metadata item values. For example, a dropdown element 124 is associated with SW VERSION metadata item and may be used to enrich a missing metadata item value (shown as [MISSING] but can also be a blank " " in some embodiments). The SW VERSION metadata item is a lower level metadata item of VERSION TYPE as illustrated with the structure in FIG. 2. In the illustration, the selected data item RECORD 115 is missing a SW VERSION (i.e., software version) metadata item value. When a user clicks the dropdown element 124, a user may select and provide the missing metadata item value to the system.

FIG. 1B further illustrates the enrichment process. The dropdown element 124, when clicked by a user, makes available its selectable options 126. A list of the selectable options may be populated from a metadata item value source (as shown in FIG. 2 metadata management 200). In some embodiments, the dropdown element 124 may further provide a selectable option 128 to make available a metadata item value for selection. In some embodiments, selecting the selectable option 128 may allow the user to enter a new metadata item value directly into the dropdown 124. In some embodiments, selecting the option 128 may cause the system to provide another user interface 200 (such as an editable spreadsheet) with which the system can receive user inputs to add a new metadata item value or modify/delete existing (including newly added) metadata item values. In some embodiments, the another user interface 200 may be accessed by clicking on a selectable user interface element, such as the manage metadata clickable user interface element 148.

In some embodiments, after receiving a missing metadata item value, the system may analyze the selected data item 108 and identify and display another missing metadata item. For example, after the system receives a new SW VERSION (indicated in FIG. 2 as "1.7 Release"), the system may find that the selected data item 108 is also missing HW VERSION. The system may proceed to display HW VERSION and another [MISSING] for HW VERSION metadata item 124, thereby prompting the user to easily move onto the next enrichable missing metadata item.

In further reference to FIG. 1A, the related data presentation elements may include a viewing pane 130 which can provide information related to the selected data item 108. The information may include images, documents, attributes, etc. In some embodiments, the system may survey related databases to collect related information, utilize ontology to perform analysis on the information, categorize the information, and/or present such information to the user. As the illustration shows, the viewing pane may include navigable views, such as Overview 132, Properties 134, Text, Documents 136, Related, Operations, etc. Some of the navigable views may provide a total number of related information associated with the view, such as the properties view 134 with its indication of "4" related information under the category (e.g., Properties (4)).

Advantageously, the viewing pane 130 provides an intuitive and efficient way for a user to gain the needed information for correctly providing the missing data item values. FIG. 1A illustrates, for example, the viewing pane 130 presenting an overview view 138A (the selection of the view indicated by emboldened fonts of Overview 132) with associated Widget 42 product description. In FIG. 1B, in response to the user selecting the documents view 138B (the selection of the view indicated by emboldened fonts of Documents 136B), the viewing pane is displaying different related data, a sales invoice. With the newly accessible sales invoice information in the documents view 138B, a user may collect information relevant to a missing metadata item value SW VERSION from the sales date indicated in the invoice (i.e., 2018-Jan.-23) that is associated with the selected data item 108. A user responsible for the metadata enrichment may understand the date to be associated with a specific version of the software (such as, "1.7 Release"). If the user finds the missing metadata in the list of available metadata item values 126, the user may select a correct metadata item value. Alternatively, if the user does not find the correct metadata item value in the list 126, the user may instruct the system to add a new metadata item value (compare FIG. 1B, 126 list and FIG. 2, 220 which received new metadata item value "1.7 Release").

In some embodiments, similar objects 160 matched based on the related data may be provided. The similar objects 160 may allow selection of the objects for temporary display in the viewing pane 130 so that the user may browse through the related data of the similar objects to identify a correct missing metadata item value for enrichment. Advantageously, the similar object 160 selection allows for utilization of data item and ontology for efficient and intuitive determination of the correct missing metadata item value.

The other elements (140, 142, 144, and 146) may provide additional security and functionality. For example, a user description 140 and user's access privilege 142 identifies the user accessing the system. Some users may not have the correct privilege, including viewing, accessing or modifying, to work with one or more databases. In the example illustration of FIGS. 1A-1B, a user 140 is identified with a user ID 140 and access level 142. The access level 142 may allow or restrict a user from working with a particular scope 102, access particular data source 104, have limited related data in the viewing pane 130, supplying one or more metadata item values, and/or modifying the metadata item value.

In some embodiments, a user may provide one or more user comments regarding the selected data item 108 via the user comment interface element 144. The comment feature will be further described in relation to FIG. 3A-3C. The comments may relate to proposed resolution or to some peculiarity of the selected data item 108.

Some other functionalities may include various analyses 146, accessing the metadata management user interface (FIG. 2, 200), and confirmation 150 of any user modifications. A user may access the metadata management user interface (FIG. 2, 200) via manage metadata clickable user interface element 148. In some embodiments, a user may also click on a user input field 128 of the dropdown 124 to initiate the system to provide the metadata management user interface (FIG. 2, 200).

The confirmation button 150, when pressed, may cause the system to update the metadata database to reflect the modifications to the metadata item values. Alternatively, or in addition to, the confirmation button 150 may cause the system to generate an data set reflecting the modifications as will be further illustrated with FIG. 3B-3C. The generated output data set may have the same structure as the input data set (for example, FIG. 3A). In some embodiments, the output data set may be the same data set as the input data set. In some embodiments, the output data set may be an independent data set from the input data set.

Metadata Management

FIG. 2 illustrates another example user interface of the metadata enrichment system, according to an embodiment. As described, the system may provide the user interface, a metadata management user interface 200, in response to a user clicking on metadata management user interface element (FIG. 1, 148) or, alternatively or in addition to, via a user clicking on the user input field 128. A user may access the metadata management user interface 200 to add, modify, or delete available metadata item values.

The metadata management user interface 200 may have a tabular structure (such as a spreadsheet) which may be editable. The example illustration provides various columns with headers (202, 204, 206, 208, 210, and 212) each representing a metadata item with cells below representing available associated metadata item values. In some embodiments, each metadata item value may also be a metadata item having own lower level metadata item values (which can also be metadata items having their own lower-lower level metadata item values). For example, the 'DELIVERY' metadata item column 202 may have associate available metadata item values of 'SHIPPED FROM,' 'SHIPPED TO,' 'CARRIER,' and 'SIGNATURE.' 'SHIPPED FROM' 204 is also a metadata item with own metadata item values 'ORIGINATING CITY,' 'ORIGINATING STATE,' and 'ORIGINATING FACILITY.' The 'ORIGINATING CITY' 206 metadata item value is also a metadata item having associated available metadata item values of 'BOSTON,' 'CHICAGO,' 'GLUCESTER,' 'SPRINGFIELD,' and 'ROCKPORT.'

In some embodiments, the spreadsheet may provide different combinations of columns and associated cells, such as providing only the lowest level metadata item values. For example, with respect to FIGS. 1A-1B, the system may present a metadata management 200 that includes 'ORIGINATING CITY' 206, 'ORIGINATING STATE' 20,' and SW VERSION '212.' In some embodiments, the metadata management user interface 200 may selectably provide the editable (e.g., insertable, deletable, or otherwise modifiable) metadata items and their associated metadata item values.

Referring back to the list of available metadata item values 126 in FIG. 1B, the metadata enrichment system made available {0.92, 1.8 Release, 2.0 Release Candidate, 2.1 Release}. As the illustrative example of FIG. 2 shows, a user may edit the available metadata item values for metadata items. For example, the user provided a new metadata item value '1.7 Release' 220 by editing the metadata management user interface 200. The new metadata item value 220 is made available for selection in the SW VERSION dropdown 124. In some embodiments, the user may exit the metadata management user interface 200 to select the newly available metadata item value 220 via the dropdown 124.

The metadata management user interface 200 provides an efficient and intuitive way of managing and selecting metadata. Additionally, the combination of the metadata enrichment system 510, viewing pane 130 providing related data, and metadata management user interface 200 provide a powerful and efficient consolidated and coordinated solution to the problem of detecting, identifying, and supplying missing metadata item values.

In some embodiments, the metadata management user interface 200 may be implemented with a structure other than a table, such as a tree. In such structure, a parent node may represent a metadata item and children nodes may represent available associated metadata item values.

Example Metadata Dataset

FIGS. 3A-3C illustrate example input data 300A set with one or more missing metadata item values and example output data sets 300B and 300C with the one or more missing metadata item values enriched, according to various embodiments. With respect to the example provided in FIGS. 1A-1B and FIG. 2, the input data set 300A may include columns including a unique ID 302A and metadata item columns, such as ORIGINATING CITY 304A, ORIGINATING STATE 306A, and SW VERSION 308A.

The metadata item columns are selected to facilitate disclosure and there may be more metadata item columns.

In a tabular (or spreadsheet-like) implementation, unique IDs of data items may be listed under the unique ID 302A column. For example, {RECORD 114, RECORD 115, . . . , RECORD 193, . . . } (312A, 314A, 316A, respectively) are listed in cells. Each data item may have associated metadata item values for the metadata items, such as ORIGINATING CITY 304A, ORIGINATING STATE 306A, and SW VERSION 308A. The input data set 300A may include some data item with no missing metadata item values, such as RECORD 114 (312A). These complete data item may, depending on the scope configuration of the selection data elements (FIGS. 1A-1B, 102 and 104), not show up on the list of data items with missing metadata item values. On the other hand, the input data set 300A may include some data items with missing metadata item values. For example, RECORD 115 (314A) is missing SW VERSION 320A and RECORD 193 (316A) is missing both the ORIGINATING CITY 322A and ORIGINATING STATE 324A, all of the missing metadata item values represented with NULL.

A user may enrich each of the missing metadata item values described above are enriched (i.e., populated) via the user interfaces of FIGS. 1A-1B and FIG. 2. For example, the user may enrich RECORD 115 (314B) with '1.7 Release' metadata item value supplied by the user. Also, the user may enrich RECORD 193 (316B) with a metadata item values of 'CHICAGO' 322B and 'IL' 324B for the metadata item ORIGINATING CITY 304A and ORIGINATING STATE 306A, respectively.

In some embodiments, the system may generate an output data set. The output data set may be generated upon a user confirming metadata item value enrichment activity including confirmation (such as via confirmation FIGS. 1A-1B, 150), changing inspected data scope (such as via scope selection interface elements FIGS. 1A-1B, 102 and 104), or exiting the metadata enrichment system user interface (FIGS. 1A-1B, 100A and 100B).

FIG. 3B illustrates an example output data set 300B which includes only the data items with at least one enriched metadata item. For example, RECORD 115 (314B) and RECORD 193 (316B) are included in this output data set 300B while RECORD 114 is excluded. Accordingly, the output data set 300B can be a concise summary which efficiently captures enrichment activities, and which may be compactly electronically stored. The output data set 300B may be beneficial when the users of the system are non-technical users who are not familiar with data or metadata. The non-technical users, after intuitively and effectively enriching missing metadata item values, can easily generate a concise enrichment activity summary. The summary may be used to quickly identify patterns in the enriched values to improve related processes and controls. Also, isolating enrichment activities in a separate output data set 300B has the additional benefit of leaving the original input data set 300A intact and enables, for example, review of the original in comparison to the enriched data for audit purposes.

FIG. 3C illustrates another output data set 300C which includes all data items in the generated output data set, regardless of enrichment. For example, a data item with no prior missing metadata item values, such as RECORD 114 (312C), is included in this output data set along with enriched data RECORD 115 (314C) and RECORD 193 (316C). In some embodiments output data set 300B may be the same data set as the input data set 300A, with the missing metadata item values replaced by enriched values. Enriching the original input data set 300A can be beneficial for numerous reasons, including providing fast enrichment to the input data set 300A and/or conservation of data storage space. For example, where multiple users are accessing and enriching the same input data set 300A, the system may dynamically reflect one user's enrichment activities on another user's graphical user interface (such as removing the unique ID associated with the enriched data item from the list of data items 110 and updating the total number 106 of enrichable data items). Also, dynamically enriching the input data set 300A leaves small data footprint and can conserve data storage space.

In some embodiments, the output data set 300C may be a separate data set (such as in a different file or database than the input data set 300A file or database). The separate output data set 300C may be beneficial when preservation of audit trail is a concern. Also, the output data set 300C can provide for simple comparison between the input data set 300A and the enriched output data set 300C.\

The output data sets 300B and 300C provide intuitive and efficient reporting of the enrichment activities. Where the output data set 300B or 300C is a separate file, database, or like from the input data set 300A, the system may also provide user interfaces or algorithms for merging (or joining) the output data set 300B or 300C into the input data set 300A such that the input data set 300A may be easily updated with the enriched metadata item values.

In some embodiments, as described, a user may provide additional metadata items for association with the data item in the output data sets. A user 'comment' related with data item may be such an additional metadata item. The example output data sets include a user supplied comment (326B and 326C) further describing RECORD 193 that the associated data item had last minute change in shipping arrangements. Advantageously, users reviewing the output data sets can gain insight that last minute change in shipping arrangements may result in missing metadata item values. From the insight, the users may focus on incorporating such last minute change in shipping arrangements to improve metadata collection process.

Example Process Flow

Figure 4:
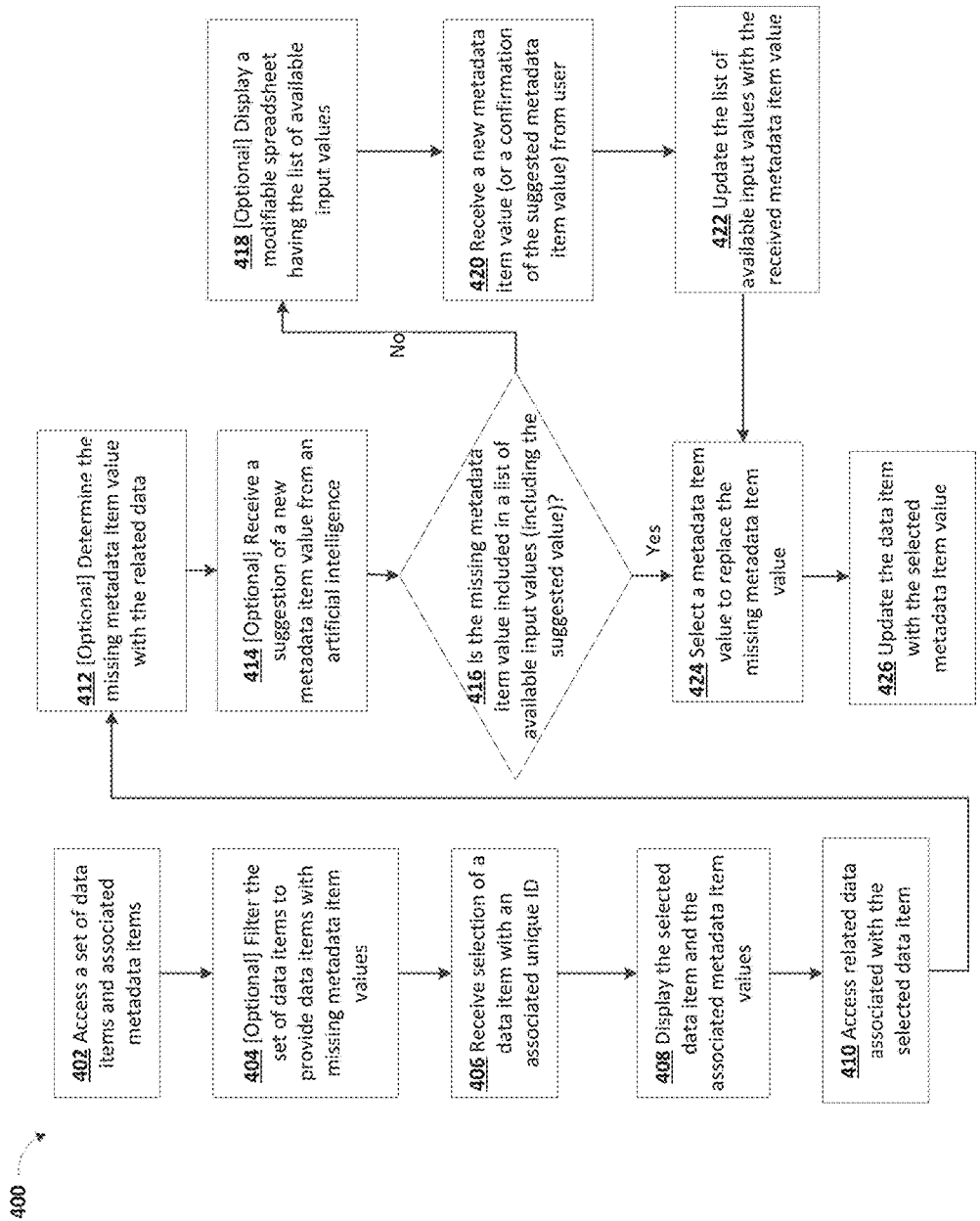
FIG. 4 is a flow chart diagram illustrating functionality of the metadata enrichment system related to identification of one or more missing metadata item values and enrichment of the missing metadata item values, according to various embodiments.

FIG. 4 is a flow chart diagram illustrating functionality of the metadata enrichment system related to identification of one or more missing metadata item values and enrichment of the missing metadata item values, according to various embodiments. Each block of the flow chart will be described with reference to the example user interfaces, data sets, and data item in the accompanying FIGS. 1A-1B, 2, and 3A-3C.

At block 402, the system accesses sets of data items and associated metadata items values. In some embodiments, the data items and associated metadata items may be maintained in a same database (such as within a same file). Such example may be a data item of a bitmapped image which is associated with a file format extension, a metadata, of *.bmp. The image file may further have timestamp metadata of the image creation or modification, which may be stored within the same file structure. In some embodiments, a data item and associated metadata item values may share a common identifier, such as a unique ID (FIG. 3A, 302A), which may be used to identify associations even when the data item and the associated metadata item values are maintained in distinct databases.

The associated metadata item values may have one or more missing metadata item values (FIG. 3A, 322A, 324A, and 320A). The missing metadata item values may be missing for various reasons, including failure in generation of the metadata or failure in associating with data. As described, such instances may arise as a result of a sensor malfunction, sensor shut down, human error, mismatching systems (including unsynchronized system versions and/or association parameters), communication failure, etc.

At block 404, the system may optionally filter the sets of data items to provide data items with missing associated metadata item values. For example, the enrichment system 100A of FIG. 1A provides a list of data items 110 identified by unique ID that includes the data items with missing metadata item values.

In some instances, a user may be interested in data set missing particular associated metadata items. For example, a logistics user may be interested in delivery-related metadata while an engineering user may be interested more in quality control-related metadata. Advantageously, the system may provide some scope selection means (such as FIG. 1A, 102) to limit the list of data items to data items missing specific one or more missing metadata item values so that selectable enrichment of the specific missing metadata item values may be facilitated. In some embodiments, such scope selection may be associated with the user's organizational role and the system may make visible only the data items associated with the user's organizational role.

At block 406, the system may receive one or more selections of data items for enrichment of missing metadata item values. The user may select data items by selecting an associated unique ID (FIG. 1A, 108).

At block 408, upon receiving the selection of data items, the system may display the selected data item and the associated metadata item values. The missing metadata item values may be represented by blanks, 'NULL,' '*' (asterisk), or the like. As FIG. 1A illustrates, the associated metadata item values may be displayed via graphical user interfaces including text fields and drop downs. In some embodiments, the selection of data items may cause the system to provide a tabular user interface (similar to FIG. 3A). Such tabular user interface may be advantageous for selection and display of multiple data items for enrichment.

At block 410, the system accesses any related data associated with the selected data item and make the related data easily available to the user. The related data may be collected, sorted, and/or associated by the system according to the selected data's ontology. It should be noted that the related data is not limited to metadata items or metadata item values, but can be any data item, document or references to document (such as a document citation), metadata, or other types of information. The related data may include words, numbers, images, sounds, etc. The related data may be human-comprehensible or machine-readable. In some instances, the system may identify and provide similar data items based on one or more data item attributes or data item's association with other data items (FIGS. 1A-1B, 160). The related data and similar data items can, by themselves or in association with other related data and/or similar data items, provide insight into determining the missing metadata item values.

At block 412, the user may determine the missing metadata value with the related data. For example, FIG. 1B illustrates one type of such related data, a sales invoice 138B associated with the selected data item RECORD 115 (108). A user reviewing the related documents (accessible via Documents view (136)) may recognize the sales date in the invoice with a particular SW VERSION (124). In some instances, a user may review the similar objects 160 that the system provides based on some matching criteria (such as the objects coming from a same production batch) to find a suggestion for the missing metadata item value. In some embodiments, an artificial intelligence or machine learning algorithm may analyze the related data and/or similar objects and provide make suggestion of the missing metadata value from the list of available metadata item values.

At block 414, an artificial intelligence may learn of the likely new value from the related data and/or similar objects and make one or more suggestions of the new value for inclusion into the list of available metadata item values at block 416. In some embodiments, the artificial intelligence may analyze similar objects and/or related data to identify the likely new value. The artificial intelligence may analyze an enrichment candidate's (i.e., missing at least one metadata item value) similar objects and/or related data to identify and suggest one or more metadata item values for the candidate's enrichable metadata item. For example, with respect to FIG. 1B, the artificial intelligence may analyze the invoice in 138B to identify the sales date of the candidate Widget 42 associated with RECORD 115 (FIG. 1A, 108). The artificial intelligence may look at a code repository's latest version at the time of shipment to suggest a likely SW VERSION for the widget. Such artificial intelligence may be based on various artificial intelligence techniques, such as pattern recognition, statistical learning, deep learning, neural networks, et cetera. In some embodiments, the artificial intelligence may associate one or more identified likely values with confidence levels and may only make a suggestion when the confidence level is sufficiently met (such as having higher value than a threshold value). At block 416, the user determines whether the suggested metadata item value for enrichment is in the list (such as FIG. 1A, 110) of available input values. If, at block 414, an artificial intelligence has suggested a likely new value (as in block 414), the list may include the suggested value as an available input value.

At block 418, the user may opt to supply the determined (or suggested by the artificial intelligence) metadata item value as a new metadata item value. In some embodiments, the user may cause the system to present a new interface capable of receiving a new value. The new interface may be a tabular interface, such as a spreadsheet. For example, FIG. 2 illustrates a tabular input form 200 that is similar to a spreadsheet. In some embodiments, the user may directly input the new value via a dropdown element (FIG. 1A, 124) by selecting an option to provide a new value (FIG. 1A, 128).

At block 420, the system receives a new metadata item value from the user. In some embodiments, an artificial intelligence may suggest likely new metadata item value, which may be the same as the value suggested at block 414. If a value was suggested, then the user may confirm the suggested value so that the suggested value may be included in the list of available metadata item values. FIG. 2 illustrates an example new metadata item value '1.7 Release' (220). In some embodiments, the user may also modify or delete metadata item values.

At block 422, the system updates the list of available input values with the received, or confirmed, metadata item value. The update may be triggered by the user closing the metadata management interface 200. Closing the metadata management interface 200 may make the user interfaces (FIGS. 1A-1B, 100A-100B) of the metadata enrichment system 510 available again. In some embodiments, the closing may cause the system to dynamically update user interface elements to reflect the change in the metadata item values. For example, the system may make available the new metadata item values in the dropdown interface element 124 allowing the user to select the new metadata item value.

At block 424, the user selects a metadata item value to replace the missing metadata item value. In some embodiments, if a new metadata item value was added or modified, the system may automatically select the added or modified metadata item value.

At block 426, the system updates the data item with the selected metadata item value. In some embodiments, the system may also perform data analysis partially or completely based on the enrichment (or modification) of the metadata item and update the related data viewing pane 130 and/or similar objects 160 in reflection of the enrichment.

Object-Centric Data Model

To provide a framework for the following discussion of specific systems and methods described herein, an example metadata enrichment system 510 using an ontology 505 will now be described. This description is provided for the purpose of providing an example and is not intended to limit the techniques to the example data model, the example metadata enrichment system, or the example metadata enrichment system's use of an ontology to represent information.

In one embodiment, a body of data is conceptually structured according to an object-centric data model represented by ontology 505. The data model is independent of any particular database used for durably storing one or more database(s) 509 based on the ontology 505. For example, each object of the data model may correspond to one or more rows in a relational database or an entry in Lightweight Directory Access Protocol (LDAP) database, or any combination of one or more databases.

Figure 5:
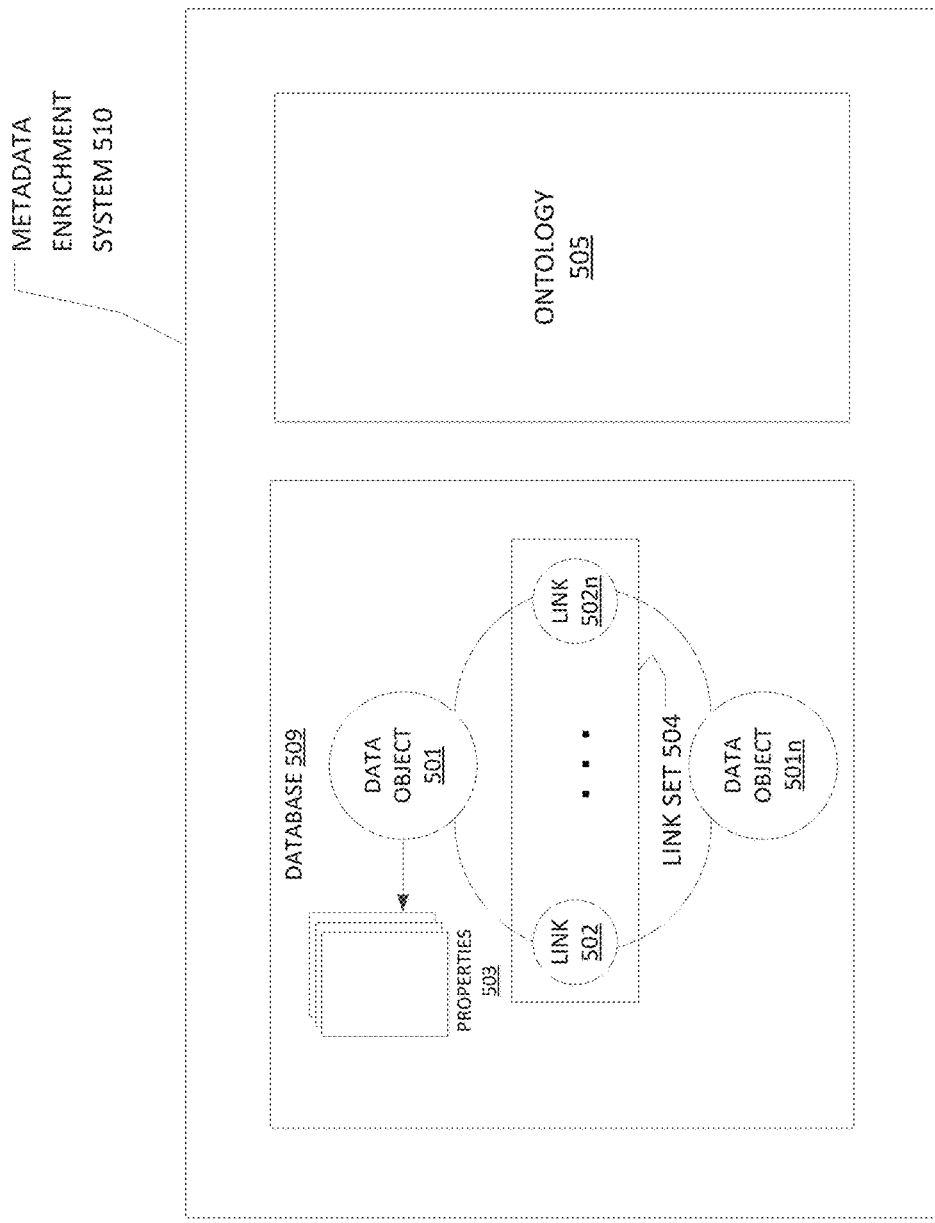
FIG. 5 illustrates an object-centric data model or ontology of a database, according to an embodiment.

FIG. 5 illustrates an object-centric data model or ontology of a database according to an embodiment. An ontology 505, as noted above, may include stored information providing a data model for storage of data in the database 509. The ontology 505 may be defined by one or more object types, which may each be associated with one or more property types. At the highest level of abstraction, data object 501 is a container for information representing things in the world. For example, data object 501 can represent an entity such as a person, a place, an organization, a market instrument, or other noun. Data object 501 can represent an event that happens at a point in time or for a duration. Data object 501 can represent a document or other unstructured data source such as an e-mail message, a news report, or a written paper or article. Each data object 501 is associated with a unique identifier that uniquely identifies the data object within the metadata enrichment system.

Different types of data objects may have different property types. For example, a "Person" data object might have an "Eye Color" property type and an "Event" data object might have a "Date" property type. Each property 503 as represented by data in the metadata enrichment system 510 may have a property type defined by the ontology 505 used by the database 505.

Objects may be instantiated in the database 509 in accordance with the corresponding object definition for the particular object in the ontology 505. For example, a specific monetary payment (e.g., an object of type "event") of US$30.00 (e.g., a property of type "currency") taking place on Mar. 27, 2009 (e.g., a property of type "date") may be stored in the database 509 as an event object with associated currency and date properties as defined within the ontology 505. The data objects defined in the ontology 505 may support property multiplicity. In particular, a data object 501 may be allowed to have more than one property 503 of the same property type. For example, a "Person" data object might have multiple "Address" properties or multiple "Name" properties.

Each link 502 represents a connection between two data objects 501. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 501 can have multiple links with another data object 501 to form a link set 504. For example, two "Person" data objects representing a husband and a wife could be linked through a "Spouse Of" relationship, a matching "Address" property, and one or more matching "Event" properties (e.g., a wedding). Each link 502 as represented by data in a database may have a link type defined by the database ontology used by the database.

Figure 6:
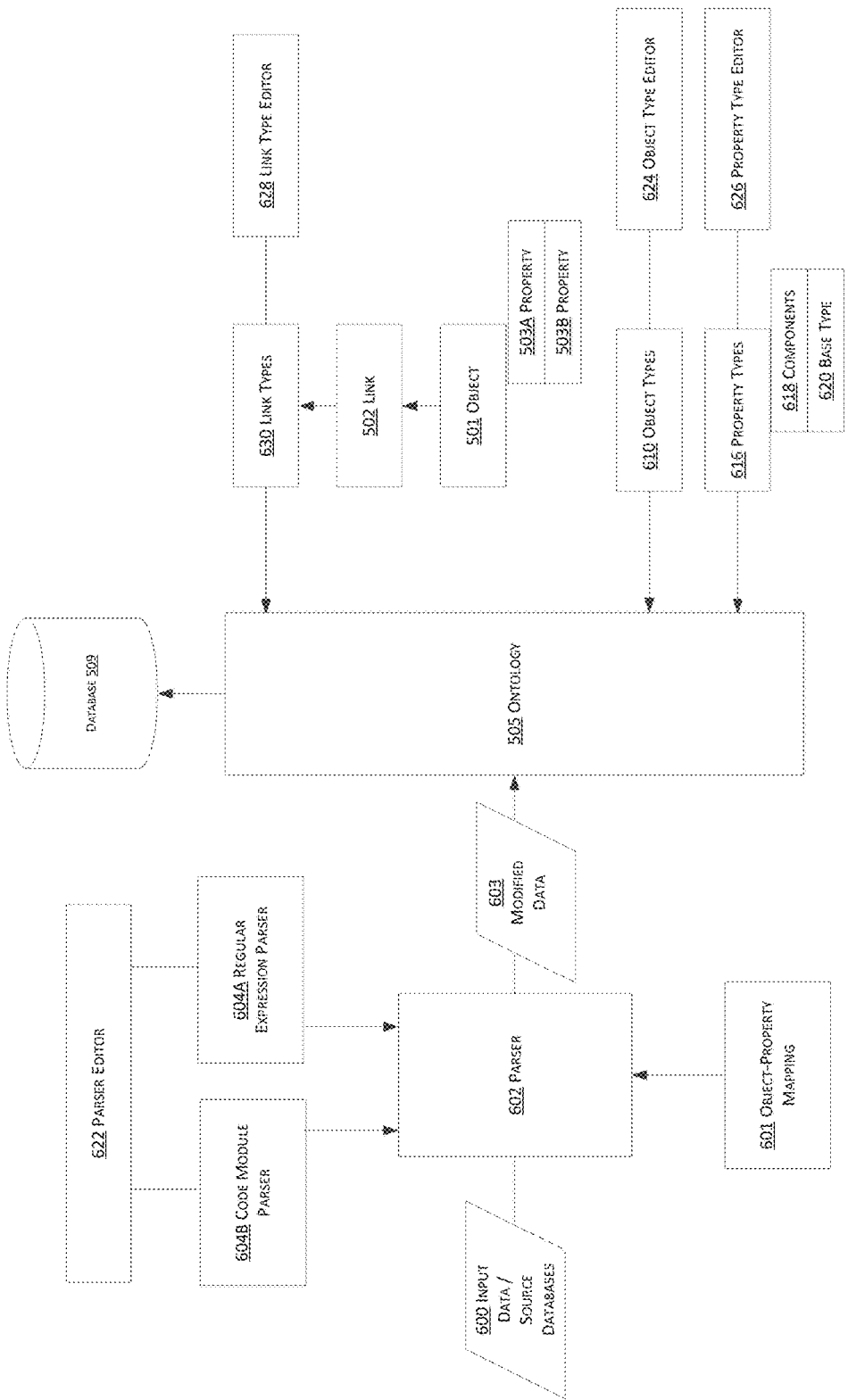
FIG. 6 is a block diagram illustrating example components and data that may be used in identifying and storing data according to an ontology.

FIG. 6 is a block diagram illustrating example components and data that may be used in identifying and storing data according to an ontology. In this example, the ontology may be configured, and data in the data model populated, by a system of parsers and ontology configuration tools. In the embodiment of FIG. 6, input data 600 is provided to parser 602. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 602 is able to read a variety of source input data types and determine which type of data it is reading.

In accordance with the discussion above, the example ontology 505 comprises stored information providing the data model of data stored in database 509, and the ontology is defined by one or more object types 610, one or more property types 616, and one or more link types 630. Based on information determined by the parser 602 or other mapping of source input information to object type, one or more data objects 501 may be instantiated in the database 509 based on respective determined object types 610, and each of the objects 501 has one or more properties 503 that are instantiated based on property types 616. Two data objects 501 may be connected by one or more links 502 that may be instantiated based on link types 630. The property types 616 each may comprise one or more data types 618, such as a string, number, etc. Property types 616 may be instantiated based on a base property type 620. For example, a base property type 620 may be "Locations" and a property type 616 may be "Home."

In an embodiment, a user of the system uses an object type editor 624 to create and/or modify the object types 610 and define attributes of the object types. In an embodiment, a user of the system uses a property type editor 626 to create and/or modify the property types 616 and define attributes of the property types. In an embodiment, a user of the system uses link type editor 628 to create the link types 630. Alternatively, other programs, processes, or programmatic controls may be used to create link types and property types and define attributes, and using editors is not required.

In an embodiment, creating a property type 616 using the property type editor 626 involves defining at least one parser definition using a parser editor 622. A parser definition comprises metadata that informs parser 602 how to parse input data 600 to determine whether values in the input data can be assigned to the property type 616 that is associated with the parser definition. In an embodiment, each parser definition may comprise a regular expression parser 604A or a code module parser 604B. In other embodiments, other kinds of parser definitions may be provided using scripts or other programmatic elements. Once defined, both a regular expression parser 604A and a code module parser 604B can provide input to parser 602 to control parsing of input data 600.

Using the data types defined in the ontology, input data 600 may be parsed by the parser 602 determine which object type 610 should receive data from a record created from the input data, and which property types 616 should be assigned to data from individual field values in the input data. Based on the object-property mapping 601, the parser 602 selects one of the parser definitions that is associated with a property type in the input data. The parser parses an input data field using the selected parser definition, resulting in creating new or modified data 603. The new or modified data 603 is added to the database 509 according to ontology 505 by storing values of the new or modified data in a property of the specified property type. As a result, input data 600 having varying format or syntax can be created in database 509. The ontology 505 may be modified at any time using object type editor 624, property type editor 626, and link type editor 628, or under program control without human use of an editor. Parser editor 622 enables creating multiple parser definitions that can successfully parse input data 600 having varying format or syntax and determine which property types should be used to transform input data 600 into new or modified input data 603.

Additional Implementation Details and Embodiments

In an implementation the metadata enrichment system (or one or more aspects of the metadata enrichment system) may comprise, or be implemented in, a "virtual computing environment." As used herein, the term "virtual computing environment" should be construed broadly to include, for example, computer readable program instructions executed by one or more processors (e.g., as described below in the example of FIG. 7) to implement one or more aspects of the modules and/or functionality described herein. Further, in this implementation, one or more modules and/or functionality of the metadata enrichment system 510 may be understood as comprising one or more rules engines of the virtual computing environment that, in response to inputs received by the virtual computing environment, execute rules and/or other program instructions to modify operation of the virtual computing environment. For example, generating user interfaces, including spreadsheet user interfaces and other user interfaces described above, enriching data, etc., may be understood as modifying operation of the virtual computing environment to create different outputs. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered or generated by the system. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the metadata enrichment system 510 as a virtual computing environment may advantageously enable executing different aspects or modules of the system on different computing devices or processors, which may increase the scalability of the system. Implementing one or more aspects of the metadata enrichment system 510 as a virtual computing environment may further advantageously enable sandboxing various aspects, data, or modules of the system from one another, which may increase security of the system by preventing, e.g., malicious intrusion into the system from spreading. Implementing one or more aspects of the metadata enrichment system 510 as a virtual computing environment may further advantageously enable parallel execution of various aspects or modules of the system, which may increase the scalability of the system. Implementing one or more aspects of the metadata enrichment system 510 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
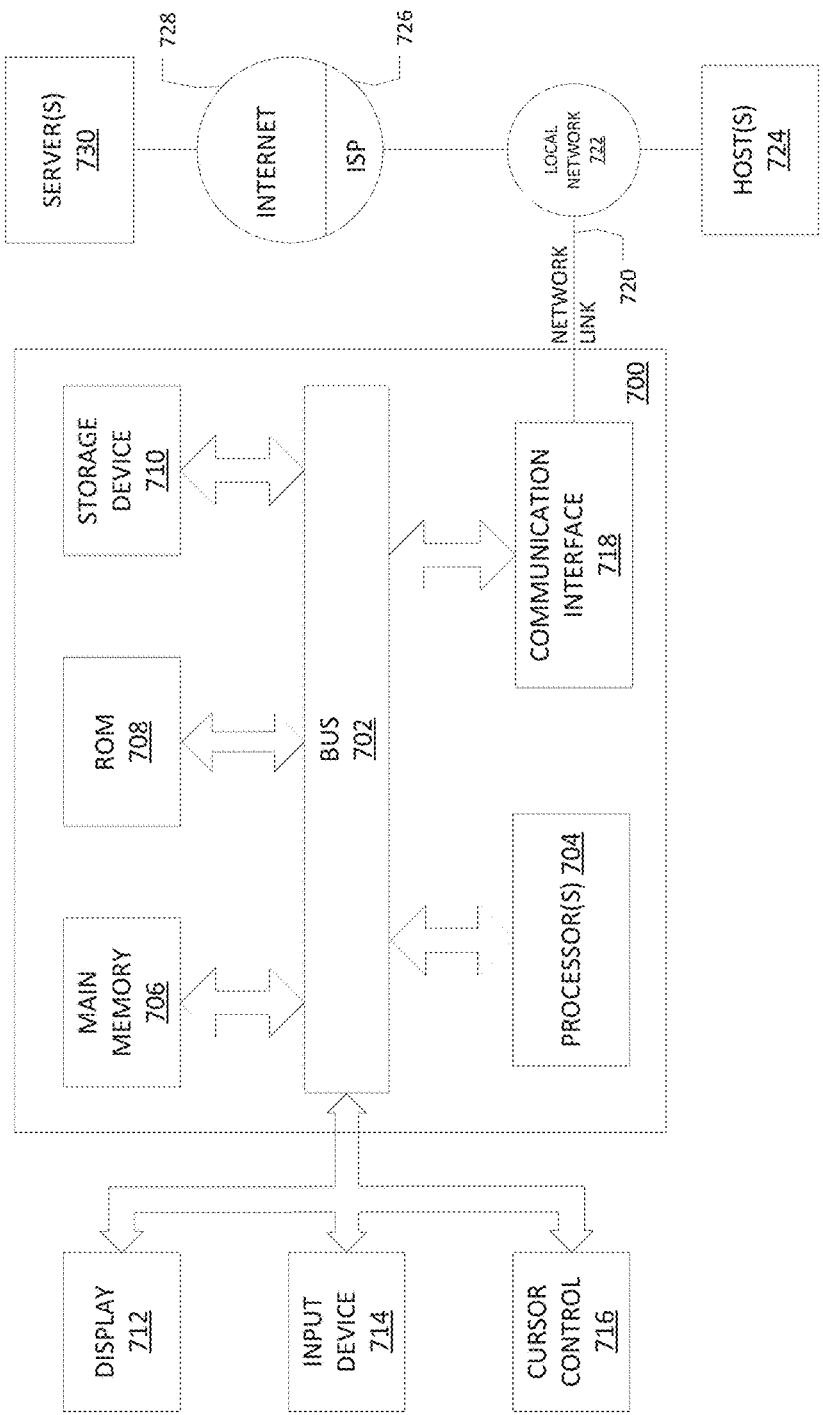
FIG. 7 illustrates a computer system with which certain methods discussed herein may be implemented.

For example, FIG. 7 is a block diagram that illustrates a computer system 700 upon which certain methods discussed herein may be implemented. The computer system 700 may implement the metadata enrichment system 510 disclosed herein, including accessing, selecting, and filtering data sets, detecting and identifying data items with missing metadata item values, and providing user interfaces to facilitate the enrichment of the missing metadata item values. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
one or more processors;
at least one storage device configured to store data,
wherein the computing system, via execution of program instructions by the one or more processors, is configured to:
access a set of data items and associated metadata items, wherein the data items are associated with unique identifiers;
provide a first interactive user interface including at least:
a list of unique identifiers associated with one or more data items of the set of data items,
selectable dropdown user interface elements associated with metadata items, and
a viewing pane configured to display collections of information related to selected data items;
in response to receiving, via the first interactive user interface, a selection of a first unique identifier of the plurality of unique identifiers:
determine a first data item associated with the unique identifier;
populate the selectable dropdown user interface elements to include metadata item values associated with the first data item; and
populate the viewing pane with a collection of information associated with the first data item;
provide a second interactive user interface configured to enable interactive modifications to selection options associated with the selectable dropdown user interface elements, wherein:
the second interactive user interface includes at least an editable spreadsheet including columns corresponding to the metadata items,
the columns include selection options associated with the corresponding metadata items, and
the editable spreadsheet is configured to receive user inputs modifying, deleting, or adding selection options associated with the corresponding metadata items; and
in response to the user exiting the second interactive user interface and returning to the first interactive user interface, dynamically update selection options in the selectable dropdown user interface elements associated with the metadata items based on selection options included in corresponding columns of the editable spreadsheet.

2. The computing system of claim 1, wherein the selection options are dynamically updated in response to the user editing the second interactive user interface by providing new metadata item value.

3. The computing system of claim 2, wherein one or more selection options are automatically suggested by the computing system and added to the dropdown selection options.

4. The computing system of claim 1, wherein at least one of the selectable dropdown user interface elements is missing a metadata item value for the associated metadata item.

5. The computing system of claim 4, wherein the computing system is further configured to:
in response to using a dropdown user interface to select a selection option from the selection options representing a metadata item value, enrich the missing metadata item value with the selected metadata item value.

6. The computing system of claim 4, wherein the computing system is further configured to:
provide a user interface to confirm one or more selections of metadata item values for the missing metadata item,
wherein in response to the user confirming the selection of metadata item values in lieu of the missing metadata item values, generate an updated data set containing a structure of the accessed data set that has replaced the missing metadata item values with the selected metadata item values.

7. The computing system of claim 6, wherein the system stores the updated data set as an independent data set from the accessed data set.

8. The computing system of claim 7, wherein the updated data set only includes data items from the accessed data set with replaced metadata item values.

9. The computing system of claim 1, wherein the viewing pane is further configured to:
provide selectable tabs each associated with a category of the collection of information related to the first data item;
receive a user input accessing one of the selectable tabs; and
in response to the user input accessing the one of the selectable tabs:
update the viewing pane to provide information associated with the category from the collection of information related to the first data item.

10. The computing system of claim 1, wherein the computing system is further configured to:
provide a user interface element capable of selecting one or more sets of data items;
receive a user input selecting one or more sets of data items; and
replace the accessed sets of data items with the one or more selected sets of data items.

11. The computing system of claim 1, wherein the data items are further associated with various classifications by which the data items are dynamically filtered, wherein the user may dynamically filter the set of data items based on classifications associated with the data items.

12. The computing system of claim 1, wherein the user is associated with one or more data item access restrictions and the system conceals from the user one or more sets of data items from selection.

13. The computing system of claim 1, wherein the set of data items is automatically filtered to only contain data items that are missing associated metadata item values.

14. The computing system of claim 1, wherein the metadata item values associated with the data item are preselected as selected options of the selectable dropdowns.

15. The computing system of claim 1, wherein the first interactive user interface is further configured to:
receive user inputs modifying, deleting, or adding user comments associated with the corresponding data item.

16. The computing system of claim 1, wherein the viewing pane is further configured to:
provide a selectable user interface element associated with a second data item having one or more common metadata item values for corresponding metadata items compared to the first data item;
receive a user input accessing the selectable user interface element; and
in response to the user input accessing the selectable user interface element:
update the viewing pane to include a collection of information related to the second data item.

17. The computing system of claim 16, wherein the viewing pane is further configured to:

provide selectable tabs each associated with a category of the collection of information related to the second data item;

receive a user input accessing one of the selectable tabs; and in response to the user input accessing the one of the selectable tabs:

update the viewing pane to provide information associated with the category from the collection of information related to the second data item.

18. The computing system of claim 1, wherein the computing system is further configured to:

provide a counter for the total number of data items with any missing metadata item values.

\* \* \* \* \*